(12) United States Patent
Suganuma et al.

(10) Patent No.: US 10,352,339 B2
(45) Date of Patent: Jul. 16, 2019

(54) LOW-NOISE DECOMPRESSION DEVICE AND COMBUSTION DEVICE

(71) Applicant: MITSUBISHI HITACHI POWER SYSTEMS, LTD., Kanagawa (JP)

(72) Inventors: Naoki Suganuma, Tokyo (JP); Takahiro Okimoto, Tokyo (JP); Noboru Kawamoto, Tokyo (JP); Shun Yamanouchi, Tokyo (JP); Tetsuya Yamada, Tokyo (JP); Toshifumi Kudo, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 200 days.

(21) Appl. No.: 15/038,231

(22) PCT Filed: Nov. 21, 2014

(86) PCT No.: PCT/JP2014/080953
§ 371 (c)(1),
(2) Date: May 20, 2016

(87) PCT Pub. No.: WO2015/098389
PCT Pub. Date: Jul. 2, 2015

(65) Prior Publication Data
US 2016/0290373 A1   Oct. 6, 2016

(30) Foreign Application Priority Data

Dec. 27, 2013  (JP) .................................. 2013-271373

(51) Int. Cl.
*F15D 1/00* (2006.01)
*F15D 1/02* (2006.01)
(Continued)

(52) U.S. Cl.
CPC ............... *F15D 1/009* (2013.01); *F15D 1/02* (2013.01); *F16L 55/02718* (2013.01);
(Continued)

(58) Field of Classification Search
CPC . F15D 1/009; F15D 1/02; F15D 1/025; F23K 5/007; F23K 2401/20; F23C 5/32; F16L 55/02718; F28F 13/00
(Continued)

(56) References Cited

U.S. PATENT DOCUMENTS

| 3,680,376 A | 8/1972 | Catheron | |
|---|---|---|---|
| 4,142,413 A * | 3/1979 | Bellinga | ................. G01F 15/00 73/198 |
| 2010/0096111 A1* | 4/2010 | Kucherov | ................. F28F 3/04 165/109.1 |

FOREIGN PATENT DOCUMENTS

| CN | 1820174 | 8/2006 |
|---|---|---|
| CN | 200972118 | 11/2007 |

(Continued)

OTHER PUBLICATIONS

International Preliminary Report on Patentability and translation of Written Opinion of the International Searching Authority dated Feb. 17, 2015 in corresponding International Application No. PCT/JP2014/080953.

(Continued)

*Primary Examiner* — Avinash A Savani
*Assistant Examiner* — Rabeeul I Zuberi
(74) *Attorney, Agent, or Firm* — Wenderoth, Lind & Ponack, L.L.P.

(57) ABSTRACT

An object is to provide a decompression device including a plurality of stages of orifice plates disposed in a flow passage, which generates less noise in response to sonic feedback phenomenon and gas-column resonance. A decom-
(Continued)

DUCT AXIAL DIRECTION pression device 10A includes: an upstream orifice plate 14 disposed in a duct 12 forming a flow passage for a fluid F; and a downstream orifice plate 16 disposed in the flow passage and downstream of the upstream orifice plate 14. A jet-flow interference part 22A is disposed only partially on an outlet rim portion of an orifice 18 on the upstream orifice plate 14 and configured to interfere with a jet flow discharged from the orifice 18. Positions of Karman vortices e are differentiated in a duct axial direction between regions with and without the jet-flow interference part 22A to reduce generation of noise.

7 Claims, 7 Drawing Sheets

(51) Int. Cl.
   F23C 5/32      (2006.01)
   F16L 55/027    (2006.01)
   F23K 5/00      (2006.01)
(52) U.S. Cl.
   CPC .............. *F23C 5/32* (2013.01); *F23K 5/007* (2013.01); *F15D 1/025* (2013.01); *F23K 2401/20* (2013.01)
(58) Field of Classification Search
   USPC ..... 138/44, 37, 185, 186, 40, 39; 165/109.1, 165/185, 186
   See application file for complete search history.

(56) References Cited

FOREIGN PATENT DOCUMENTS

| | | |
|---|---|---|
| CN | 102138050 | 7/2011 |
| CN | 203300214 | 11/2013 |
| JP | 38-6806 | 4/1963 |
| JP | 60-60304 | 4/1985 |
| JP | 61-75505 | 5/1986 |
| JP | 4-25094 | 2/1992 |
| JP | 6-33917 | 2/1994 |
| JP | 6-50527 | 2/1994 |
| JP | 6-185691 | 7/1994 |
| JP | 7-5357 | 2/1995 |
| JP | 2001-124280 | 5/2001 |
| JP | 2005-9667 | 1/2005 |
| JP | 2005-155884 | 6/2005 |
| JP | 2015-86968 | 5/2015 |

OTHER PUBLICATIONS

International Search Report dated Feb. 17, 2015 in corresponding International Application No. PCT/JP2014/080953, with English translation.

Office Action dated Dec. 2, 2016 in corresponding Chinese Application No. 201480057678.1 (with English Translation).

* cited by examiner

DUCT AXIAL DIRECTION

ARROW A VIEW

ARROW B VIEW

DUCT AXIAL DIRECTION

LOW-NOISE DECOMPRESSION DEVICE AND COMBUSTION DEVICE

TECHNICAL FIELD

The present invention relates to a low-noise decompression device to be disposed in a fuel-gas supply duct or the like for supplying fuel gas to a boiler, for instance, and a combustion device including the low-noise decompression device.

BACKGROUND ART

A boiler combusts fuel to heat water and produce steam. Fuel gas is supplied from a fuel supply source to a burner disposed in a gas-fired boiler through a duct, and a decompression device is disposed in the duct to adjust a fuel-supply pressure to the burner.

Patent Document 1 discloses a decompression device applied to a liquid-transfer duct. This decompression device has an uneven section with a wavy cross section formed on an inner wall of a duct forming a flow passage, and a plurality of sheets of mesh metal disposed entirely over a transverse plane inside the duct.

Patent Document 2 discloses a decompression device including a plurality of stages of perforated orifice plates disposed in a flow direction in a flow passage, and mesh-shaped porous metal disposed between the perforated orifice plates. The apertures on the perforated orifice plates have a diameter increasing toward downstream stages, and each aperture is disposed so that apertures on the next stage are invisible when seen from an upstream side toward a downstream side.

CITATION LIST

Patent Literature

Patent Document 1: JPS60-60304A
Patent Document 2: JPH07-5357U (Utility Model)

SUMMARY

Problems to be Solved

Since the decompression device disclosed in Patent Document 1 has an uneven section with a wavy cross section formed on an inner wall of a duct forming a flow passage, a large amount of processing time is required, and a troublesome work is required to provide a plurality of sheets of metal mesh entirely over a transverse plane inside the duct.

FIG. 8 is a diagram of a typical compression device with a plurality of orifice plates disposed in a flow passage, as disclosed in Patent Document 2. In FIG. 8, an upstream orifice plate 104 and a downstream orifice plate 108 are disposed in a flow passage for a fluid F formed inside a duct 102. A total opening area of orifices 110 formed on the downstream orifice plate 108 is larger than a total opening area of an orifice 106 formed on the upstream orifice plate 104. Thus, the decompression device can create pressure loss to function as a decompression device.

Further, the orifice 106 and the orifices 110 are disposed on different positions on a flow-passage cross section. In this way, the fluid F is blocked and a kinetic pressure of the fluid F is reduced.

Karman vortices e are periodically generated downstream of the orifice 106. A generation frequency fk (Hz) of Karman vortices e can be expressed by the following expression:

$$fk = St \cdot V/(L+h), \quad (1)$$

where St is a Strouhal number, V is a flow rate (m/s) of the fluid F, L is an orifice interval (m), and h is an orifice thickness (m).

Further, a flow-passage space R surrounded by the upstream orifice plate 104 and the downstream orifice plate 108 has a unique vibrational mode determined by a physical property of the fluid F. If the unique vibrational frequency or its multiple matches the generation frequency fk, gas-column resonance is excited and noise is generated in the flow-passage space R.

For instance, when expressions of St=2.84, V=158 m/s, L=0.102 m, and h=0.004 m are satisfied, fk=4233 Hz is satisfied.

FIG. 9 is a graph showing a noise level generated by the decompression device 100. X-axis in this graph represents a frequency of noise generation. FIG. 9 shows that noise having a sharp peak frequency is generated when the unique vibrational frequency of the flow-passage space R matches the generation frequency fk of Karman vortices e.

Meanwhile, in the decompression device 100 depicted in FIG. 8, a plurality of Karman vortices e is generated at positions dispersed in the circumferential direction of the orifice 106 and at the same position in a duct axial direction, in the vicinity of an outlet rim portion of the orifice 106 of the upstream orifice plate 104, and generation of Karman vortices e generates vibrational waves. The vibrational waves generated by respective Karman vortices e propagate to the downstream orifice plate 108 at the same phase to be reflected. In this case, vibrational waves generated by subsequently-produced Karman vortices are amplified by the reflected waves of the same phase reflected by the downstream orifice plate 108. In response to such sonic feedback phenomenon, large noise may be produced.

In view of the above problem of conventional techniques, an object of the present invention is to provide a decompression device which includes a plurality of stages of orifice plates disposed in a flow passage and which produces less noise in response to sonic feedback phenomenon and gas-column resonance.

Solution to the Problems

To achieve the above object, a low-noise decompression device according to an embodiment of the present invention comprises: a duct forming a flow passage for a fluid; an upstream orifice plate disposed in the flow passage and having an orifice; a downstream orifice plate disposed in the flow passage and downstream of the upstream orifice plate; and a jet-flow interference part disposed only partially on an outlet rim portion of the orifice and configured to interfere with a jet flow discharged from the orifice.

With the jet-flow interference part being disposed only partially on the outlet rim portion of the orifice on the upstream orifice plate, generation positions of a plurality of Karman vortices generated in the vicinity of the outlet of the orifice of the upstream orifice plate can be varied in a duct axial direction. Thus, vibrational waves generated by respective Karman vortices propagate to the downstream orifice plate at different phases. Accordingly, vibrational waves generated by subsequently-produced Karman vortices may no longer be amplified by reflected waves of the vibrational waves reflected by the downstream orifice plate.

Further, Karman vortices generated at different positions in a duct axial direction have different generation frequencies from one another, which makes it possible to reduce incidence of gas-column resonance. Accordingly, it is possible to suppress sonic feedback phenomenon and to prevent gas-column resonance, which makes it possible to reduce generation of noise in a flow-passage space between the upstream orifice plate and the downstream orifice plate effectively.

Further, the jet-flow interference part may be disposed on a position where the jet-flow interference part can interfere with a jet flow discharged from the orifice of the upstream orifice plate. Further, the jet-flow interference part may be disposed partially on the outlet rim portion of the orifice, and a region with the jet-flow interference part and a region without the jet-flow interference part may coexist in the circumferential direction of the orifice.

In an embodiment of the present invention, the jet-flow interference part comprises a rod-shaped member extending along a tangent direction of the orifice. In this way, it is possible to form the jet-flow interference part readily and at lower cost.

In an embodiment of the present invention, the rod-shaped member is a block-shaped member having a quadrilateral cross section. In this way, it is possible to form the jet-flow interference part readily and at lower cost even further.

In an embodiment of the present invention, the jet-flow interference part has a curved surface extending along the axial direction of the duct and curving along the outlet rim portion of the orifice. In this way, it is possible to form the jet-flow interference part readily and at lower cost even further along the outlet rim portion of the orifice.

In an embodiment of the present invention, a recess portion is formed on a part of a wall surface forming the outlet rim portion of the orifice of the upstream orifice plate, and the jet-flow interference part comprises a part of the wall surface without the recess portion. In this way, it is possible to form the jet-flow interference part readily and at lower cost.

In an aspect of the present invention, the jet-flow interference part has a length, in an axial direction of the duct, of from one to two times a diameter of the orifice.

In this way, it is possible to achieve a sufficient positional difference in the duct axial direction between generation positions of Karman vortices in a region with the jet-flow interference part and generation positions of Karman vortices in a region without the jet-flow interference part, in the circumferential direction of the orifice, and there is no longer a risk of affecting a decompression effect of the decompression device.

Further, a combustion device according to the present invention comprises: the above low-noise decompression device; and a burner disposed on a terminating end of a fuel-gas supply duct which is the duct, the burner being configured to combust fuel gas which is the fluid and which has a pressure reduced by the low-noise decompression device.

Accordingly, with the fuel gas supply duct including the low-noise decompression device according to the present invention, it is possible to reduce noise in the fuel gas supply duct effectively.

Advantageous Effects

According to an embodiment of the present invention, with the jet-flow interference part being provided only partially on the outlet rim portion of the orifice of the upstream orifice plate, it is possible to suppress sonic feedback phenomenon and to prevent gas-column resonance phenomenon, which makes it possible to reduce noise generated in a decompression device effectively.

DETAILED DESCRIPTION

Embodiments of the present invention will now be described in detail with reference to the accompanying drawings. It should be noted that, unless otherwise particularly specified, the sizes, materials, shapes, and relative arrangement or the like of constituent components described in these embodiments are not intended to limit the scope of this invention.

Embodiment 1

Figure 1:
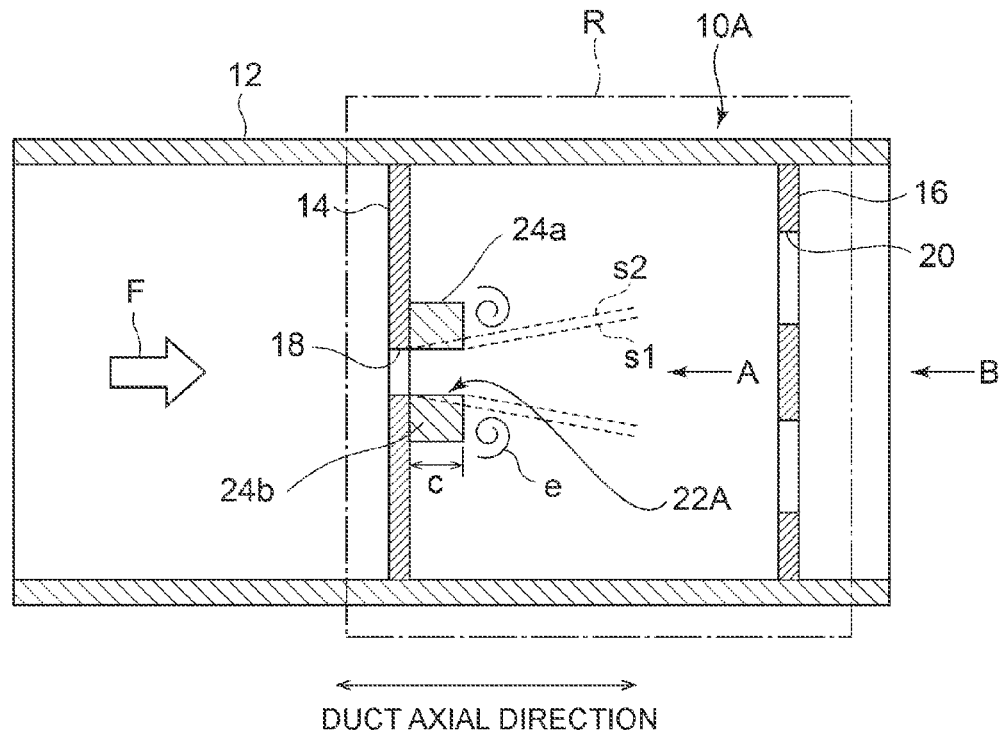
FIG. 1 is a front cross-sectional view of a decompression device according to the first embodiment of the present invention.
Figure 2:
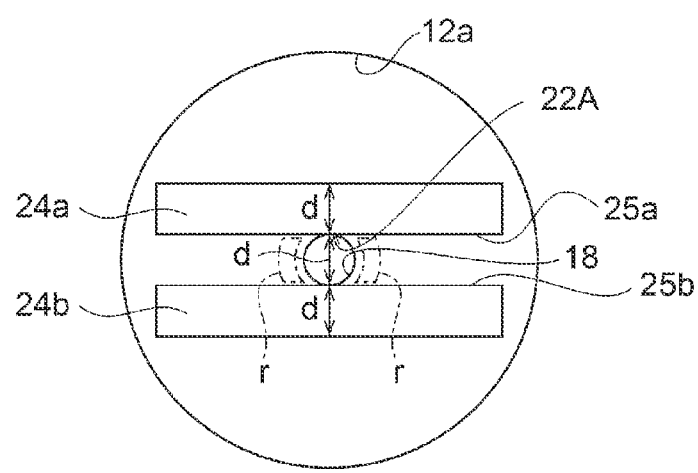
FIG. 2 is a view in a direction of arrow A from FIG. 1.
Figure 3:
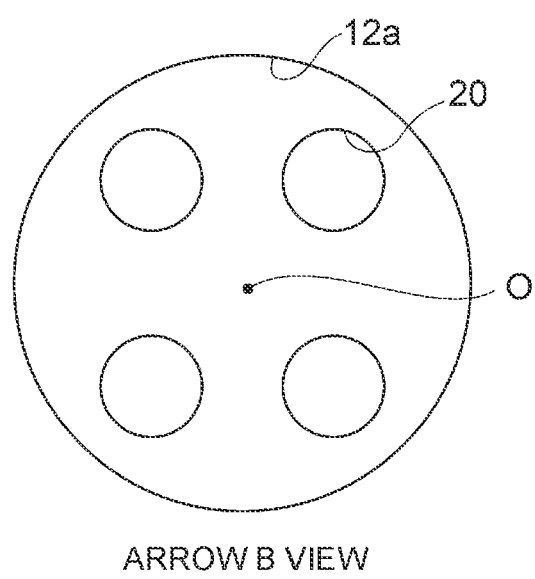
FIG. 3 is a view in a direction of arrow B from FIG. 1.

A decompression device according to the first embodiment of the present invention will be described with reference to FIGS. 1 to 3. In FIGS. 1 to 3, a flow passage is formed inside a duct 12, and a fluid F flows through the flow passage in a direction of the arrow. The decompression device 10 of the present embodiment includes an upstream orifice plate 14 disposed inside the duct 12, and a downstream orifice plate 16 disposed downstream of the upstream orifice plate 14. The upstream orifice plate 14 and the downstream orifice plate 16 are disposed so as to traverse the flow passage formed inside the duct 12, i.e., in a direction orthogonal to an inner surface 12a of the duct 12.

The upstream orifice plate 14 has one orifice 18 of a circular shape formed in center, and the downstream orifice plate 16 has four orifices 20 of a circular shape. The four orifices 20 are disposed symmetrically and centered at the center point O of the downstream orifice plate 16. An opening area of the orifice 18 is smaller than the total opening area of the orifices 20. Thus, the decompression device can create pressure loss to function as a decompression device.

Further, the orifices 20 are disposed on such positions that the orifices 20 are invisible if seen from the orifice 18 toward downstream. Specifically, the orifices 18 and 20 are disposed on the upstream orifice plate 14 and the downstream orifice plate 16, respectively, so that projection of the orifice 18 in an axial direction of the duct 12 (hereinafter, also referred to as a duct axial direction) does not overlap with the orifices 20. Thus, the decompression device can create pressure loss by blocking the fluid F to function as a decompression device.

A jet-flow interference part 22A is fixed at an outlet rim portion of the orifice 18, with respect to a fluid flow direction, and on a back surface of the upstream orifice plate 14, with respect to the fluid flow direction. The jet-flow interference part 22A includes two block-shaped members 24a, 24b. The block-shaped members 24a, 24b have a quadrilateral cross section and a linear shape in the longitudinal direction. The block-shaped members 24a, 24b extend along a tangent direction of the orifice 18 so as to contact a part of the outlet rim portion of the orifice 18.

For instance, if the duct 12 is disposed in the horizontal direction, the block-shaped member 24a is disposed so as to extend in the horizontal direction orthogonal to the duct 12 at an upper part of the outlet of the orifice 18, while the block-shaped member 24b is disposed so as to extend in the horizontal direction orthogonal to the duct 12 at a lower part of the outlet of the orifice 18.

Further, the block-shaped members 24a, 24b are disposed on positions of interference by a jet flow discharged from the orifice 18. Specifically, the block-shaped members 24a, 24b have flat side surfaces 25a, 25b, respectively, extending along the duct axial direction from the outlet rim portion of the orifice 18. A position of interference by a jet flow is, in other words, a position to be contacted by a jet flow.

With the above configuration, in a region where the block-shaped members 24a, 24b are disposed as jet-flow interference members in the circumferential direction of the orifice 18, a jet flow of the fluid F discharged from the outlet of the orifice 18 spreads out as represented by dotted lines s1 in FIG. 1, and Karman vortices e are generated immediately downstream of the block-shaped members 24a, 24b. In a region without the block-shaped members 24a, 24b (regions r in FIG. 2), a jet flow spread out as represented by dotted lines s2, and Karman vortices e are generated immediately downstream of the outlet of the orifice 18. That is, generation regions of Karman vortices e in the duct axial direction are different between a region with the jet-flow interference part 22A and a region r without the jet-flow interference part 22A, in the circumferential direction of the orifice 18. In other words, a wall surface of the orifice 18 is substantially elongated in the duct axial direction and generation positions of Karman vortices e are offset toward downstream in a region with the jet-flow interference part 22A, as compared to a region r without the jet-flow interference part 22A.

Thus, a plurality of vibrational waves generated by a plurality of produced Karman vortices e propagates to the downstream orifice plate 16 at phases different from one another. Thus, vibrational waves generated by subsequently-produced Karman vortices e may be no longer amplified by reflected waves of the vibrational waves reflected by the downstream orifice plate 16.

Further, Karman vortices e generated at different positions in the duct axial direction have different generation frequencies fk, which makes it possible to reduce incidence of gas-column resonance. Accordingly, it is possible to reduce generation of noise in the flow-passage space R between the upstream orifice plate 14 and the downstream orifice plate 16 effectively.

Further, with the block-shaped members 24a, 24b being provided as the jet-flow interference part 22A, it is possible to install the jet-flow interference part 22A readily and at lower cost.

If the length C of a jet-flow interference member in the duct axial direction, which is the length C of the block-shaped members 24a, 24b in the duct axial direction, is from one to two times the diameter of the orifice 18, it is possible to achieve a sufficient positional difference in the duct axial direction between generation positions of Karman vortices e in a region with the jet-flow interference part 22A and generation positions of Karman vortices e in a region r without the jet-flow interference part 22A, in the circumferential direction of the orifice 18, and there is no longer a risk of affecting a decompression effect of the decompression device 10. Thus, the length C of the block-shaped members 24a, 24b in the duct axial direction may be from one to two times the diameter of the orifice 18.

The width of the block-shaped members 24a, 24b in the radial direction of the orifice 18 is the same as the diameter d of the orifice 18, for instance.

Further, the jet-flow interference part 22A may include only one of the block-shaped members 24a, 24b, whereby a noise-reduction effect can still be achieved.

Embodiment 2

Figure 4:
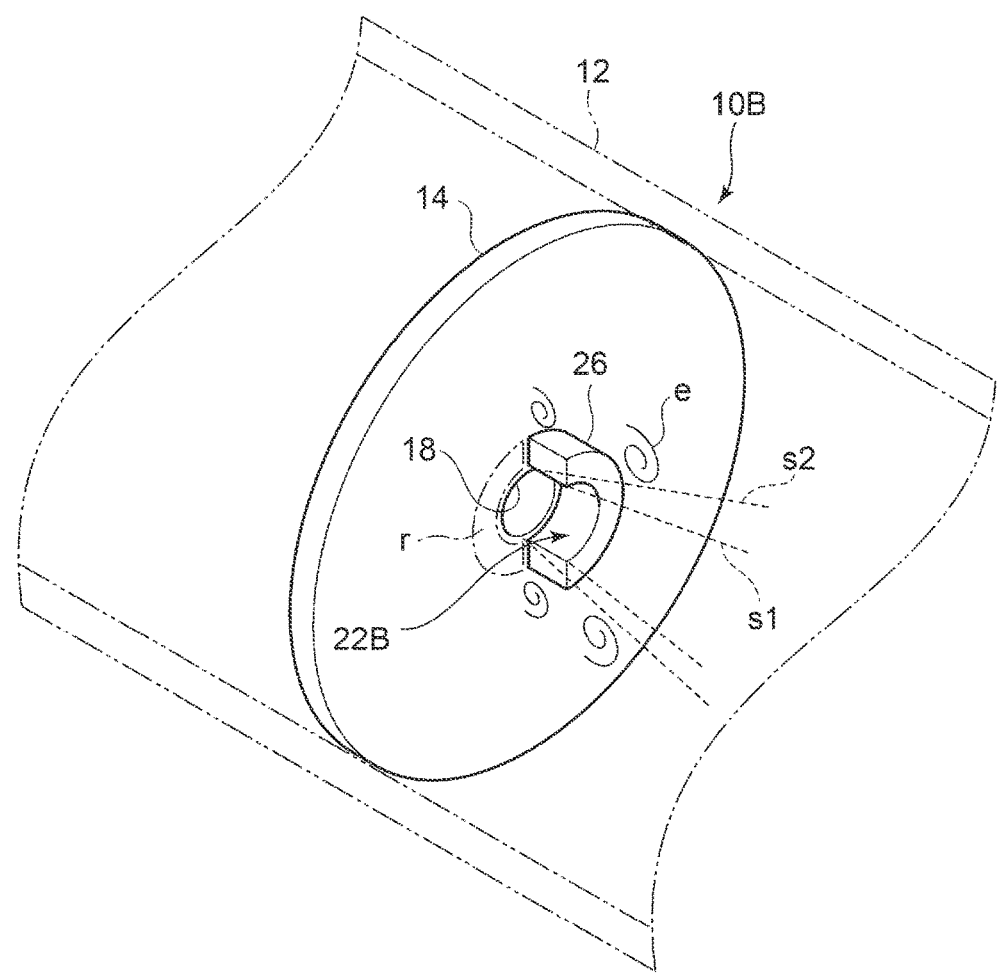
FIG. 4 is a partial perspective view of a decompression device according to the second embodiment of the present invention.

Next, the second embodiment of the present invention will be described with reference to FIG. 4. In FIG. 4, the decompression device 10B according to the present embodiment includes the orifice 18 of a circular shape formed in center of the upstream orifice plate 14, similarly to the first embodiment. A jet-flow interference part 22B of the present embodiment includes a jet-flow interference member 26 disposed on a back surface of the upstream orifice plate 14 with respect to the fluid flow direction.

The jet-flow interference member 26 has a semi-cylindrical shape and is disposed concentric with the orifice 18 and along the outlet rim portion of the orifice 18. The jet-flow interference member 26 extends along the duct axial direction and has a quadrilateral cross section in a direction along the radial direction of the orifice 18. Further, the jet-flow interference member 26 has a curved semi-arc shape along the outlet rim portion of the orifice 18. An inner side surface of the jet-flow interference member 26 is formed into a semi-arc shape, i.e., a curved surface, and is disposed along the outlet rim portion of the orifice 18. The configuration is otherwise the same as that of the first embodiment, including the downstream orifice plate 16.

In the above configuration, the jet-flow interference member 26 is disposed on a position of interference by a jet flow discharged from the orifice 18. In a region with the jet-flow interference member 26 in the circumferential direction of the orifice 18, a jet flow discharged from the outlet of the orifice 18 spreads out as represented by dotted lines s1 in FIG. 4, and Karman vortices e are generated downstream of the jet-flow interference member 26. In a region without the jet-flow interference member 26 (region r in FIG. 4), a jet flow spreads out as represented by dotted lines s2, and Karman vortices e are generated immediately downstream of the orifice 18.

Thus, generation positions of Karman vortices e in the duct axial direction are different between a region with the jet-flow interference member 26 and a region r without the jet-flow interference member 26. Accordingly, a plurality of vibrational waves generated by a plurality of produced Karman vortices e propagates to the downstream orifice plate 16 at phases different from one another. Thus, vibrational waves generated by subsequently-produced Karman vortices e may be no longer amplified by reflected waves reflected by the downstream orifice plate 16.

Further, Karman vortices e generated at different positions in the duct axial direction have different generation frequencies fk, which makes it possible to reduce incidence of gas-column resonance. Accordingly, it is possible to reduce generation of noise in the flow-passage space R between the upstream orifice plate 14 and the downstream orifice plate 16 effectively.

Further, with the jet-flow interference member 26 being provided as the jet-flow interference part 22B, it is possible to install the jet-flow interference part 22B readily and at lower cost.

It should be noted that a position to provide the jet-flow interference member 26 in the circumferential direction of the orifice 18 is not particularly limited. For instance, if the duct 12 is disposed in the horizontal direction, the interference member 26 can be disposed on an upper side, a lower side, or a lateral side of the outlet rim portion of the orifice 18.

Embodiment 3

Next, the third embodiment of the present invention will be described with reference to FIGS. 5 and 6. A decompression device 10C according to the present embodiment includes the orifice 18 of a circular shape formed in center of the upstream orifice plate 14, similarly to the first embodiment. In the present embodiment, recess portions 28 are formed on four positions on the outlet rim portion of the orifice 18. Specifically, the recess portions 28 are formed on a part of a wall surface (inner peripheral surface) forming the orifice 18.

The recess portions 28 have a fan shape as seen in the duct axial direction, and have the same length in the circumferential direction and the same central angle with one another. The recess portions 28 extend in the duct axial direction, and have a quadrilateral cross section along the radial direction of the orifice 18. The recess portions 28 have an opening on the wall surface forming the orifice 18.

The recess portions 28 are disposed at regular intervals in the circumferential direction of the orifice 18. Accordingly, there are four regions r with no recess portion 28 formed between the recess portions 28, and wall-surface portions each disposed between adjacent two of the recess portions 28 form a jet-flow interference part 22C. The length in the circumferential direction of each recess portion 28 and the length in the circumferential direction of each region r are equal to each other. The configuration is otherwise the same as that of the first embodiment, including the downstream orifice plate 16.

In the above configuration, in the present embodiment, the length of the orifice 18 in the duct axial direction is relatively shortened in the regions with the recess portions 28, and the length of the orifice 18 in the duct axial direction is relatively elongated in the regions r without the recess portions 28. Accordingly, it can be said that the jet-flow interference part 22C is disposed on the outlet rim portion of the orifice 18 of the upstream orifice plate 14 in the regions r (see FIG. 6) without the recess portions 28.

Figure 5:
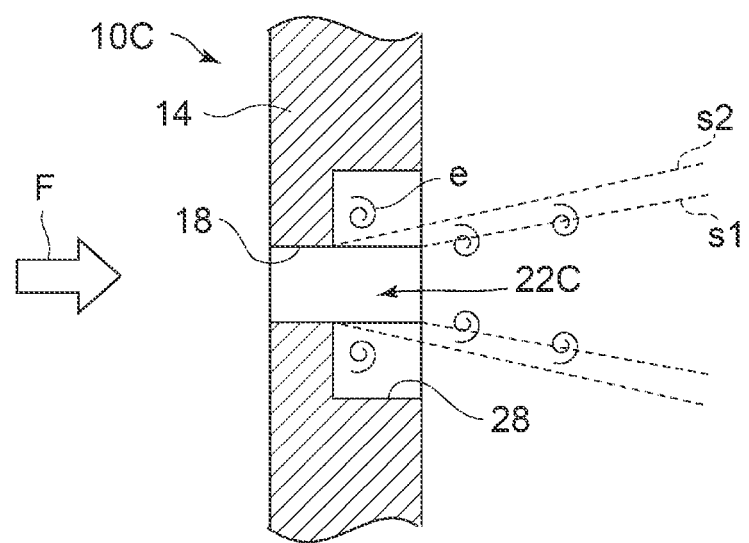
FIG. 5 is a partial front cross-sectional view of a decompression device according to the third embodiment of the present invention.
Figure 6:
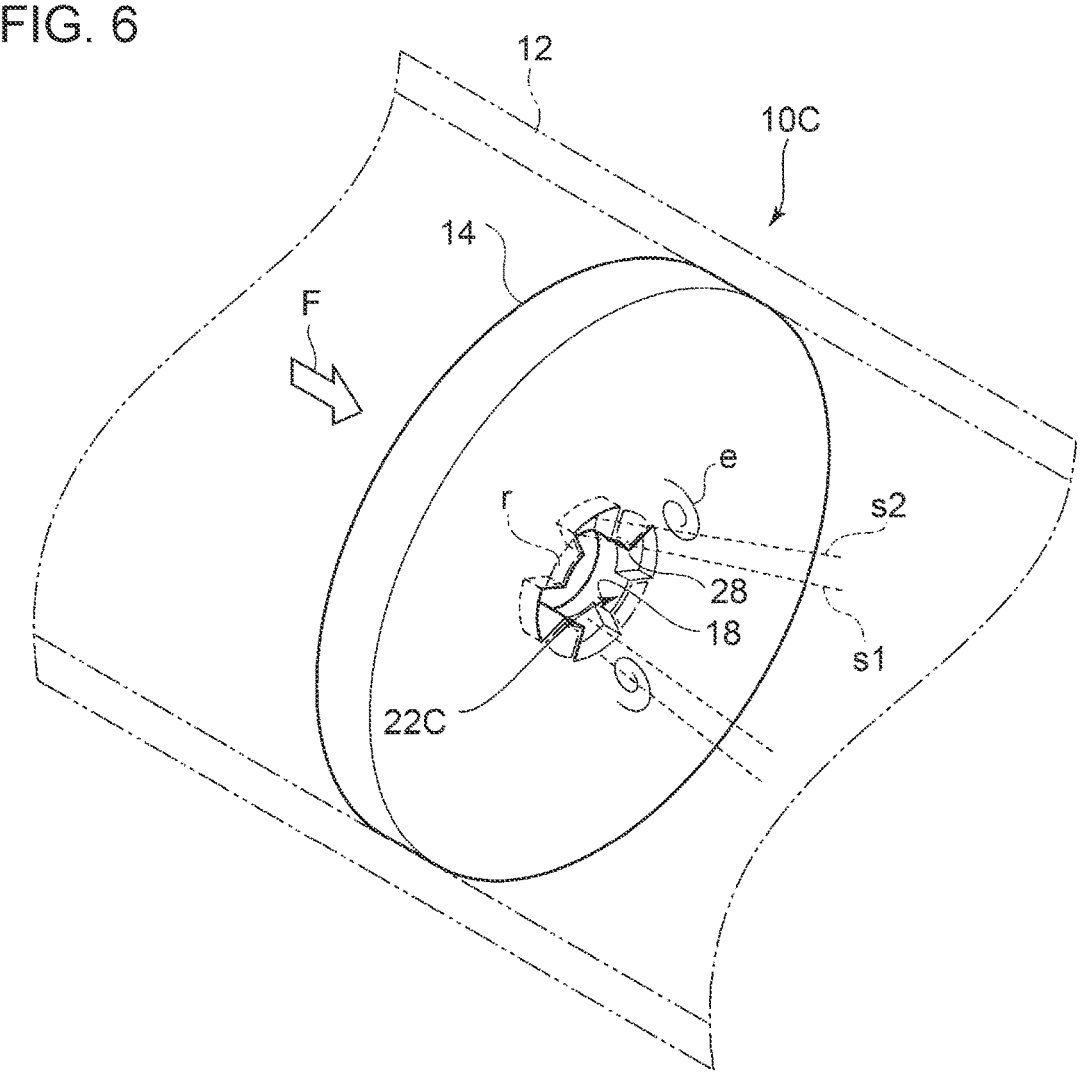
FIG. 6 is a partial perspective view of the decompression device depicted in FIG. 5.

In the regions r without the recess portions 28 in the circumferential direction of the orifice 18, a jet flow of the fluid F discharged from the orifice 18 spreads out as represented by dotted lines s1 in FIGS. 5 and 6, and Karman vortices e are generated immediately downstream of the back surface of the upstream orifice plate 14 in the fluid flow direction. In the regions with the recess portions 28, a jet flow spreads out as represented by dotted lines s2, and Karman vortices e are generated immediately downstream of bottom surfaces of the recess portions 28. The bottom surfaces of the recess portions 28 are disposed upstream of the back surface of the upstream orifice plate 14 with respect to the fluid flow direction.

Thus, generation positions of Karman vortices e in the duct axial direction are different between the regions r with the jet-flow interference part 22C and the regions without the jet-flow interference part 22C. Accordingly, a plurality of vibrational waves generated by a plurality of produced Karman vortices e propagates to the downstream orifice plate 16 at phases different from one another. Thus, vibrational waves generated by subsequently-produced Karman vortices e may be no longer amplified by reflected waves of the vibrational waves reflected by the downstream orifice plate 16.

Further, Karman vortices e generated at different positions in the duct axial direction have different generation frequencies fk, which reduces incidence of gas-column resonance. Accordingly, it is possible to suppress sonic feedback phenomenon and prevent resonance phenomenon, which makes it possible to reduce generation of noise.

Further, it is possible to form the jet-flow interference part 22C by a simple machining process of forming the recess portions 28 on the upstream orifice plate 14, which makes it possible to form the jet-flow interference part 22C readily and at less cost.

Embodiment 4

Figure 7:
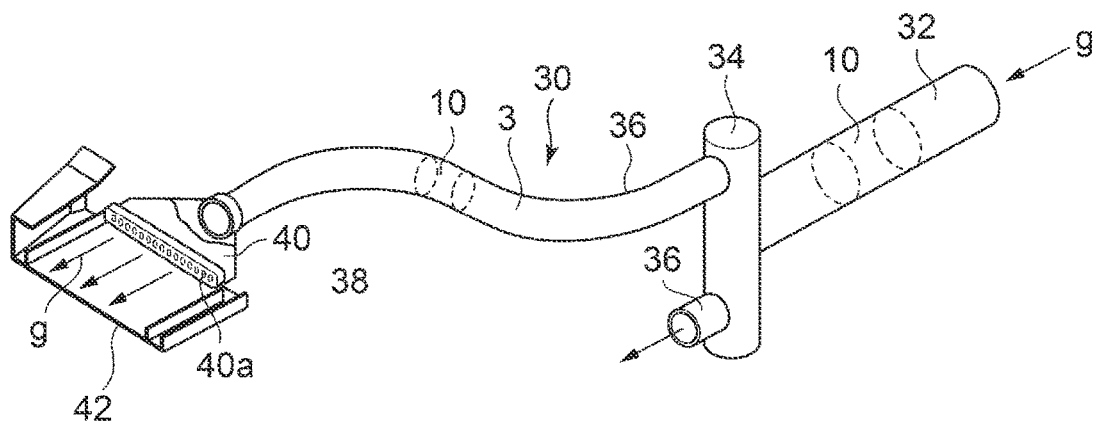
FIG. 7 is a perspective view of a combustion device according to an embodiment of the present invention.
Figure 8:
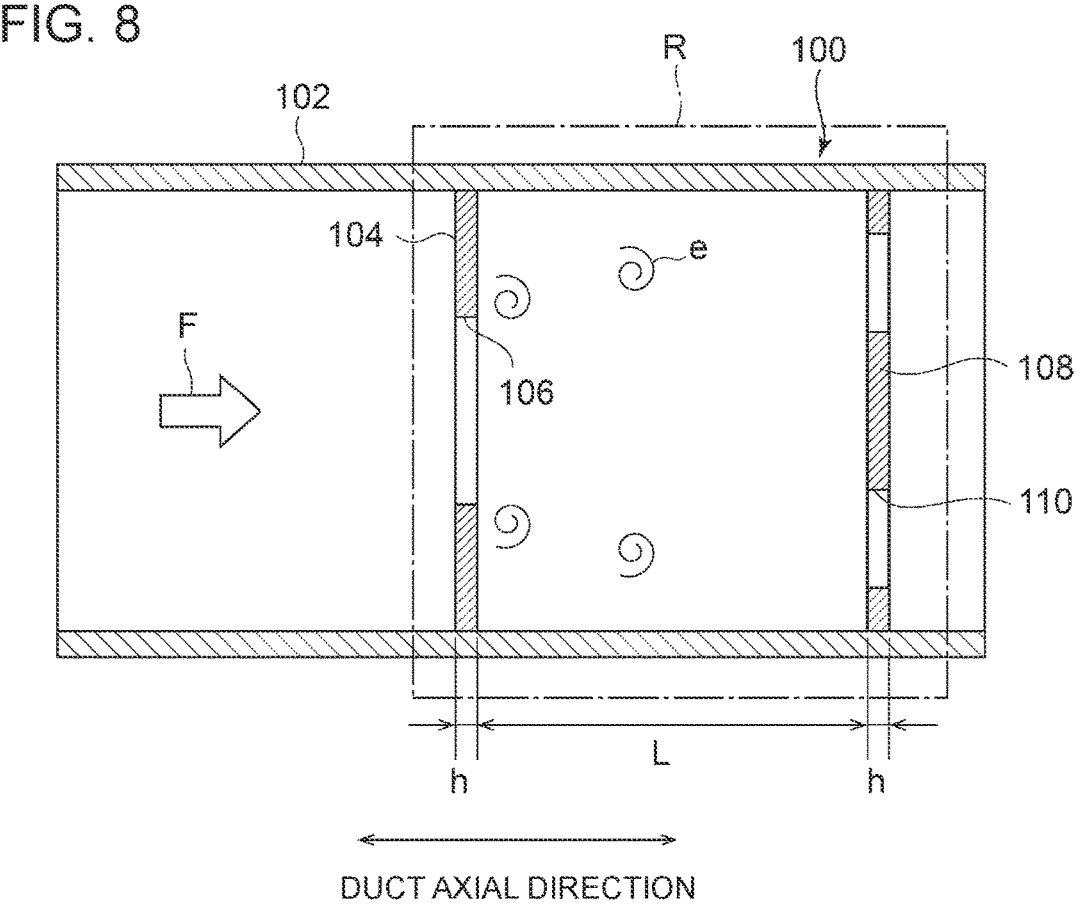
FIG. 8 is a front cross-sectional view of a typical decompression device.
Figure 9:
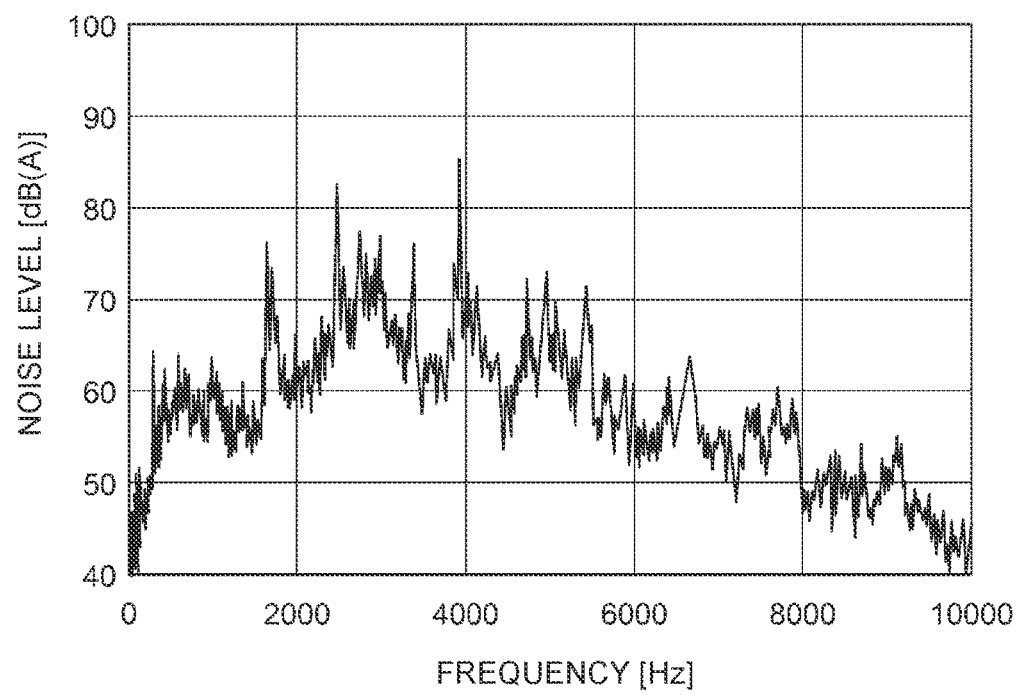
FIG. 9 is a graph showing a relationship between a frequency and a noise level of noise generated in a flow-passage space.

Next, an embodiment of a combustion device of the present invention will be described with reference to FIG. 7. In FIG. 7, in a combustion device 30 according to the present embodiment, fuel gas g is introduced in to a fuel gas introduction duct 32 from a fuel gas supply source (not depicted). The fuel gas introduction duct 32 is connected to a fuel gas collective duct 34. A plurality of fuel gas branch ducts 36 is connected to the fuel gas collective duct 34. A gas burner 38 is disposed on a terminating end of each fuel gas branch duct 36. The gas burner 38 is, for instance, mounted to a partition wall of a boiler furnace.

The gas burner 38 includes a stopper nozzle 40 which is attached to the terminating end of each fuel gas branch duct 36 and which has a tapered housing, and a gas nozzle 42 connected to an end surface of the stopper nozzle 40. Fuel gas g is discharged from a plurality of nozzle holes 40a formed on the end surface of the stopper nozzle 40, and is supplied into the boiler furnace, for instance, from the gas nozzle 42.

The decompression device 10, which is selected from the decompression devices 10A to 10C of the above respective embodiments, is disposed in the fuel gas introduction duct 32 and the fuel gas branch ducts 36.

According to the present embodiment, with the decompression device 10 being provided in the fuel gas introduction duct 32 and the fuel gas branch ducts 36, it is possible to reduce noise generated in the fuel gas introduction duct 32 and the fuel gas branch ducts 36 effectively. Further, it is possible to install the decompression device 10 readily and at lower cost.

DESCRIPTION OF REFERENCE NUMERALS 10, 10A, 10B, 10C, 100 Decompression device
12, 102 Duct 14, 104 Upstream orifice plate
16, 108 Downstream orifice plate
18, 20, 106, 110 Orifice
22A, 22B, 22C Jet-flow interference part
24a, 24b Block-shaped member
26 Interference member
28 Recess portion
30 Combustion device
32 Fuel gas introduction duct
34 Fuel gas collective duct
36 Fuel gas branch duct
38 Gas burner
40 Stopper nozzle
42 Gas nozzle
e Karman vortex
g Fuel gas
s1, s2 Jet flow

The invention claimed is:

1. A low-noise decompression device, comprising:
a duct forming a flow passage for a fluid;
an upstream orifice plate disposed in the flow passage and having an orifice;
a downstream orifice plate disposed in the flow passage and downstream of the upstream orifice plate; and
a jet-flow interference part disposed only partially on an outlet rim portion of the orifice of the upstream orifice plate and configured to interfere with a jet flow discharged from the orifice of the upstream orifice plate,
wherein the jet-flow interference part comprises a block fixed at the outlet rim portion tangent to the orifice of the upstream orifice plate, with respect to a fluid flow direction, and on a back surface of the upstream orifice plate, with respect to the fluid flow direction.

2. The low-noise decompression device according to claim 1,
wherein the jet-flow interference part is configured such that a generation position of a Karman vortex is varied in an axial direction of the duct in accordance with a position in a circumferential direction of the orifice of the upstream orifice plate.

3. The low-noise decompression device according to claim 1,
wherein the block has a quadrilateral cross section.

4. The low-noise decompression device according to claim 1,
wherein the jet-flow interference part has a length, in an axial direction of the duct, of from one to two times a diameter of the orifice of the upstream orifice plate.

5. A combustion device, comprising:
the low-noise decompression device according to claim 1; and
a burner disposed on a terminating end of a fuel-gas supply duct which is the duct, the burner being configured to combust fuel gas which is the fluid and which has a pressure reduced by the low-noise decompression device.

6. The low-noise decompression device according to claim 1,
wherein the block has a linear shape in a longitudinal direction.

7. The low-noise decompression device according to claim 6,
wherein the block extends along a tangent direction of the orifice so as to contact a part of the outlet rim portion of the orifice.

* * * * *